(12) United States Patent
Helm

(10) Patent No.: US 10,630,407 B2
(45) Date of Patent: Apr. 21, 2020

(54) SYSTEMS AND METHODS FOR PROVIDING AN IN-VEHICLE IMAGE SUPPLEMENT

(75) Inventor: Sean L. Helm, Saline, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 1544 days.

(21) Appl. No.: 13/453,624

(22) Filed: Apr. 23, 2012

(65) Prior Publication Data
US 2013/0278827 A1  Oct. 24, 2013

(51) Int. Cl.
| G06F 17/30 | (2006.01) |
| H04H 20/62 | (2008.01) |
| H04H 60/74 | (2008.01) |
| H04H 40/00 | (2009.01) |
| G06F 16/48 | (2019.01) |

(52) U.S. Cl.
CPC ............ *H04H 20/62* (2013.01); *G06F 16/48* (2019.01); *H04H 40/00* (2013.01); *H04H 60/74* (2013.01)

(58) Field of Classification Search
CPC ......... H04H 20/00; H04H 40/00; H04H 60/00
See application file for complete search history.

(56) References Cited

U.S. PATENT DOCUMENTS

| 6,317,784 | B1 | 11/2001 | Mackintosh et al. | |
| 6,349,329 | B1 | 2/2002 | Mackintosh et al. | |
| 8,868,602 | B2* | 10/2014 | Lesser | G06F 17/30106 707/770 |
| 2008/0222546 | A1* | 9/2008 | Mudd et al. | 715/765 |
| 2009/0045951 | A1 | 2/2009 | Rajan et al. | |
| 2009/0275306 | A1* | 11/2009 | Kraft et al. | 455/344 |
| 2010/0265398 | A1* | 10/2010 | Johnson et al. | 348/500 |

OTHER PUBLICATIONS

Chinese Office Action pertaining to Chinese Application No. 201310142050.9 dated Apr. 28, 2017.
Chinese Office Action pertaining to Chinese Application No. 201310142050.9 dated Nov. 27, 2017.
Chinese Final Rejection Decision pertaining to Chinese Application No. 201310142050.9 dated May 10, 2018.

* cited by examiner

*Primary Examiner* — Brian T Pendleton
*Assistant Examiner* — Kyle M Lotfi
(74) *Attorney, Agent, or Firm* — Dinsmore & Shohl LLP

(57) ABSTRACT

Systems and methods for providing an in-vehicle image supplement are disclosed. One embodiment includes receiving a broadcast media signal that includes a content portion and a metadata portion, determining whether a primary image is included in the metadata portion, and in response to determining that the primary image is included in the metadata portion, providing the primary image for display. Additionally, in response to determining that the primary image is not included in the metadata portion, some embodiments include determining whether the primary image is otherwise available and in response to determining that the primary image is otherwise available, retrieving the primary image and providing the primary image for display. In response to determining that the primary image is not otherwise available, some embodiments include determining whether a secondary image is available, retrieving the secondary image, and providing the secondary image for display.

20 Claims, 6 Drawing Sheets

SYSTEMS AND METHODS FOR PROVIDING AN IN-VEHICLE IMAGE SUPPLEMENT

TECHNICAL FIELD

Embodiments described herein generally relate to systems and methods for providing an in-vehicle image supplement and, more specifically, to mechanisms for providing a hierarchical approach to providing imagery for content being played in a vehicle.

BACKGROUND

As media signals, such as terrestrial radio, satellite radio, internet radio, etc. are received by a vehicle, the media signals may include a content portion and a metadata portion. A vehicle audio system may playback the content portion, while the metadata may include information about the received content portion. Specifically, the metadata may include information regarding the title, artist, album, etc. of the received content portion. Additionally, the metadata may include imagery that may be provided to a display device in the vehicle. The imagery may include an album cover image to provide additional information regarding the content portion being played. While the album cover image may enhance the visual data provided on the display device, oftentimes the imagery may not be included in the metadata and/or may otherwise not be immediately displayed when the content portion begins playback. As a consequence, oftentimes important and/or aesthetic information is not provided while the content portion is being played.

SUMMARY

Systems and methods for providing an in-vehicle image supplement are disclosed. One embodiment includes receiving a broadcast media signal that includes a content portion and a metadata portion, determining whether a primary image is included in the metadata portion, and in response to determining that the primary image is included in the metadata portion, providing the primary image for display. Additionally, in response to determining that the primary image is not included in the metadata portion, some embodiments include determining whether the primary image is otherwise available and in response to determining that the primary image is otherwise available, retrieving the primary image and providing the primary image for display. In response to determining that the primary image is not otherwise available, some embodiments include determining whether a secondary image is available, retrieving the secondary image, and providing the secondary image for display.

In another embodiment, a system includes a memory component that stores logic that, when executed by the system, causes the system to receive a broadcast media signal that includes a content portion and a metadata portion, determine whether an album cover image is included in the metadata portion, and in response to determining that the album cover image is included in the metadata portion, provide the album cover image for display. In some embodiments, in response to determining that the album cover image is not included in the metadata portion, the logic further causes the system to determine whether the album cover image is stored and, in response to determining that the album cover image is stored, retrieve the album cover image and provide the album cover image for display. Similarly, in some embodiments, in response to determining that the album cover image is not stored, the logic causes the system to determine whether an artist image is stored, in response to determining that the artist image is stored, retrieve the artist image, provide the artist image for display, and in response to determining that the album cover image becomes available, replace the artist image with the album cover image.

In yet another embodiment, a vehicle includes display device and a vehicle computing device that stores logic. The logic causes the vehicle computing device to receive a broadcast media signal that includes a content portion and a metadata portion and determine whether a higher priority image is included in the metadata portion. In some embodiments, in response to determining that the higher priority image is included in the metadata portion, the logic causes the vehicle computing device to provide the higher priority image for display with the content portion. In response to determining that the higher priority image is not included in the metadata portion, the logic may cause the vehicle computing device to determinate whether the higher priority image is otherwise available. In response to determining that the higher priority image is otherwise available, the logic may cause the vehicle computing device to retrieve the higher priority image and provide the higher priority image for display with the content portion. In response to determining that the higher priority image is not otherwise available, the logic may cause the vehicle computing device to determine whether a lower priority image is available. In response to determining that the lower priority image is available, the logic may cause the vehicle computing device to retrieve the lower priority image and provide the lower priority image for display with the content portion. Further, in response to determining that the higher priority image becomes available after display of the lower priority image, the logic may cause the vehicle computing device to replace the lower priority image with the higher priority image.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for providing an in-vehicle image supplement. Some embodiments allow a more seamless artwork reception experience to the end user in a vehicle when listening to radio. In many current implementations, artwork for received content is sent only for the station and/or frequency that the vehicle is currently playing. When a user changes the frequency, the artwork may or may not be available until the next artwork is received for the new frequency. As such, the artwork may be absent for at least a portion of playback of the content. Accordingly, embodiments disclosed herein include an embedded database of artwork. The embodiments may receive program service data (PSD) over a radio broadcast protocol. The PSD may be used to query the database to identify relevant artwork for the currently playing content portion. Embodiments may additionally use a priority scheme to prioritize the types of images that are displayed. As an example, priorities for the artwork could include 1) an album cover image or other primary image acquired from the source; 2) the album cover image acquired from a database; 3) an artist image or other secondary image; 4) a genre image or other tertiary image; 5) a station logo image or other quarternary image; and 6) a generic image or other quinary image. As soon as a higher priority image is acquired, the lower priority image (or lowest priority image) may be replaced.

Figure 1:
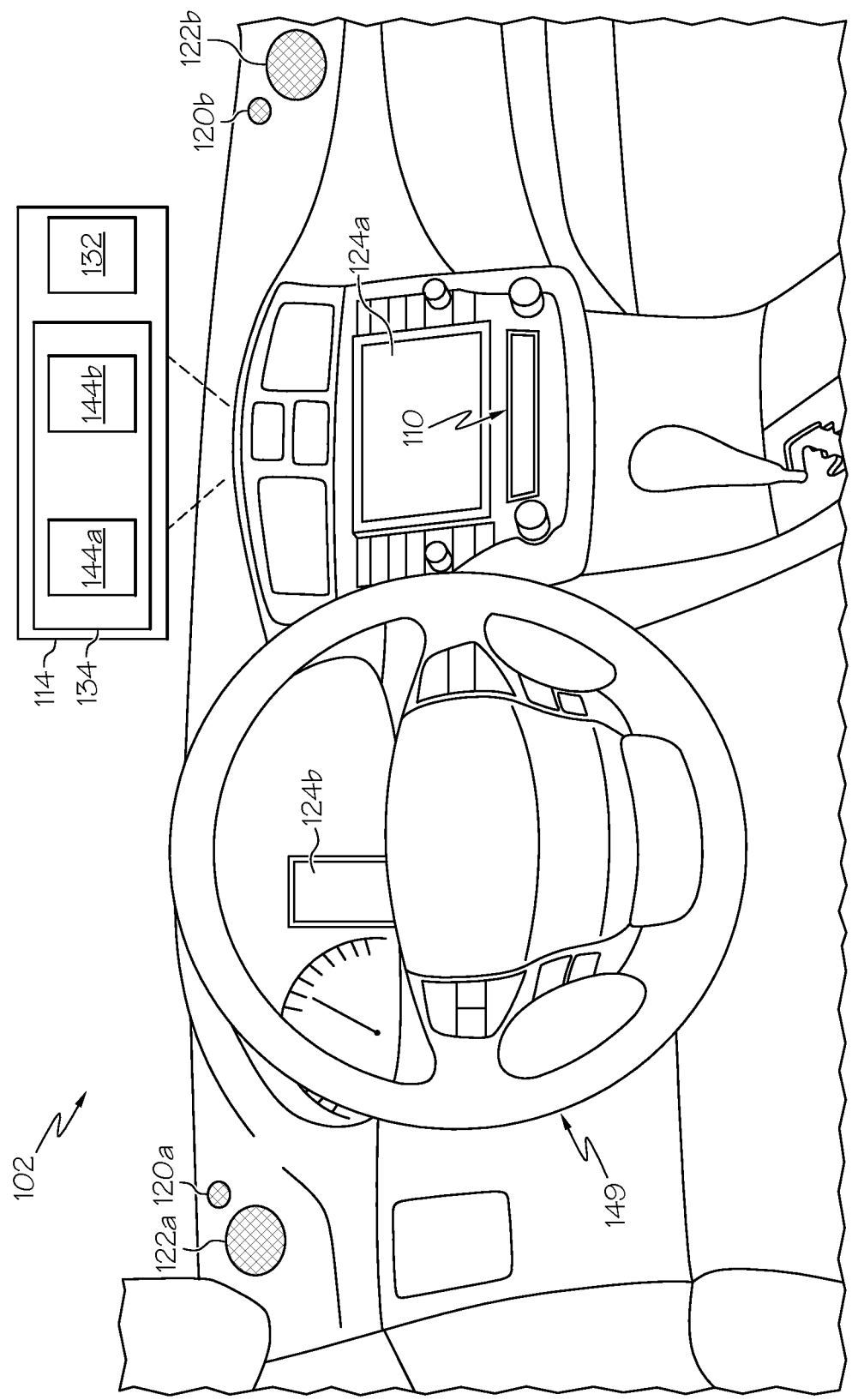
FIG. 1 schematically depicts an interior portion of a vehicle for providing an in-vehicle image supplement, according to embodiments disclosed herein.

Referring now to the drawings, FIG. 1 schematically depicts an interior portion of a vehicle 102 for providing an in-vehicle image supplement, according to embodiments disclosed herein. As illustrated, the vehicle 102 may include a console display 124a and a dash display 124b (referred to independently and/or collectively herein as "display device 124"). The console display 124a may be configured to provide one or more user interfaces and may be configured as a touch screen and/or include other features for receiving user input. The dash display 124b may similarly be configured to provide one or more interfaces, but often the data provided in the dash display 124b is a subset of the data provided by the console display 124a. Regardless, at least a portion of the user interfaces depicted and described herein may be provided on either or both the console display 124a and the dash display 124b.

Also included in the vehicle 102 is a content playback device 110, which may include a tape player, a compact disc player, a digital video disc player, a media file player, a radio signal receiver, a television signal receiver, an internet receiver, etc. The content playback device 110 may be operated via a touch screen of the display device 124, and/or one or more other inputs, such as on the dashboard and/or a steering wheel 149 of the vehicle 102. Also coupled to the content playback device 110 and/or display device 124 are one or more microphones 120a, 120b and one or more speakers 122a, 122b. The one or more microphones 120a, 120b may be configured for receiving user voice commands and/or other inputs. Similarly, the speakers 122a, 122b may be utilized for providing audio content from the content playback device 110 to the user. The content playback device 110, microphones 120, speakers 122, and/or related components may represent an in-vehicle audio system.

Figure 6:
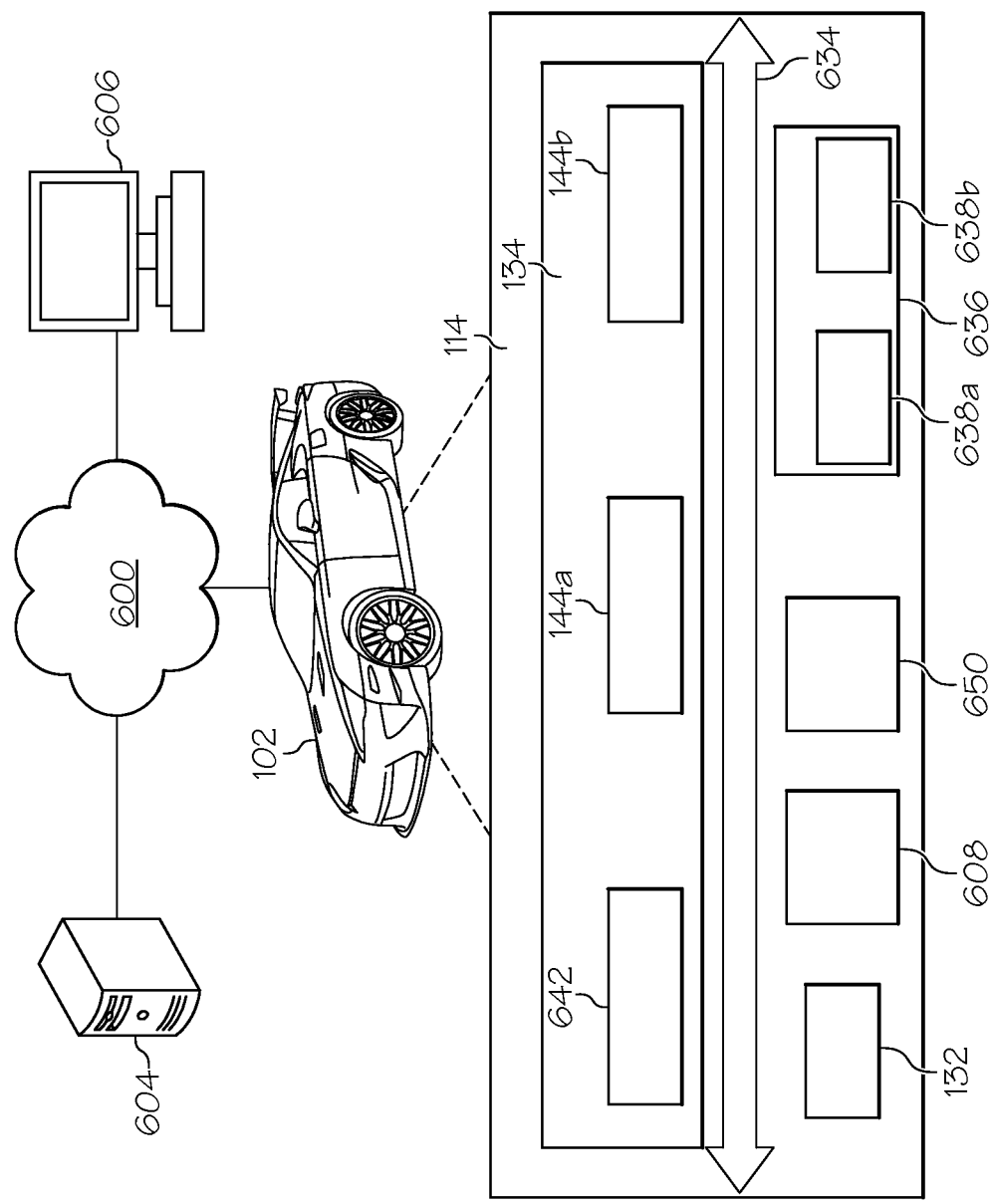
FIG. 6 depicts a network environment for providing an in-vehicle image supplement, according to embodiments disclosed herein.

The vehicle 102 also includes a vehicle computing device 114. The vehicle computing device 114 may be configured with a processor 132 and a memory component 134, which may store image logic 144a and triggering logic 144b. The image logic 144a and the triggering logic 144b may each include a plurality of different pieces of logic, each of which may be embodied as a computer program, firmware, and/or hardware, as an example. The image logic 144a may be configured to cause the vehicle computing device 114 to cause imagery to be provided to the display device 124 for display. Similarly, the triggering logic 144b may be configured to identify triggering actions that occur for replacing currently displayed imagery. Additional components of the vehicle 102 are depicted in FIG. 6 and described in more detail below. Similarly, other triggering actions may be detected by the vehicle computing device 114 for altering the in-vehicle presentation.

Figure 2:
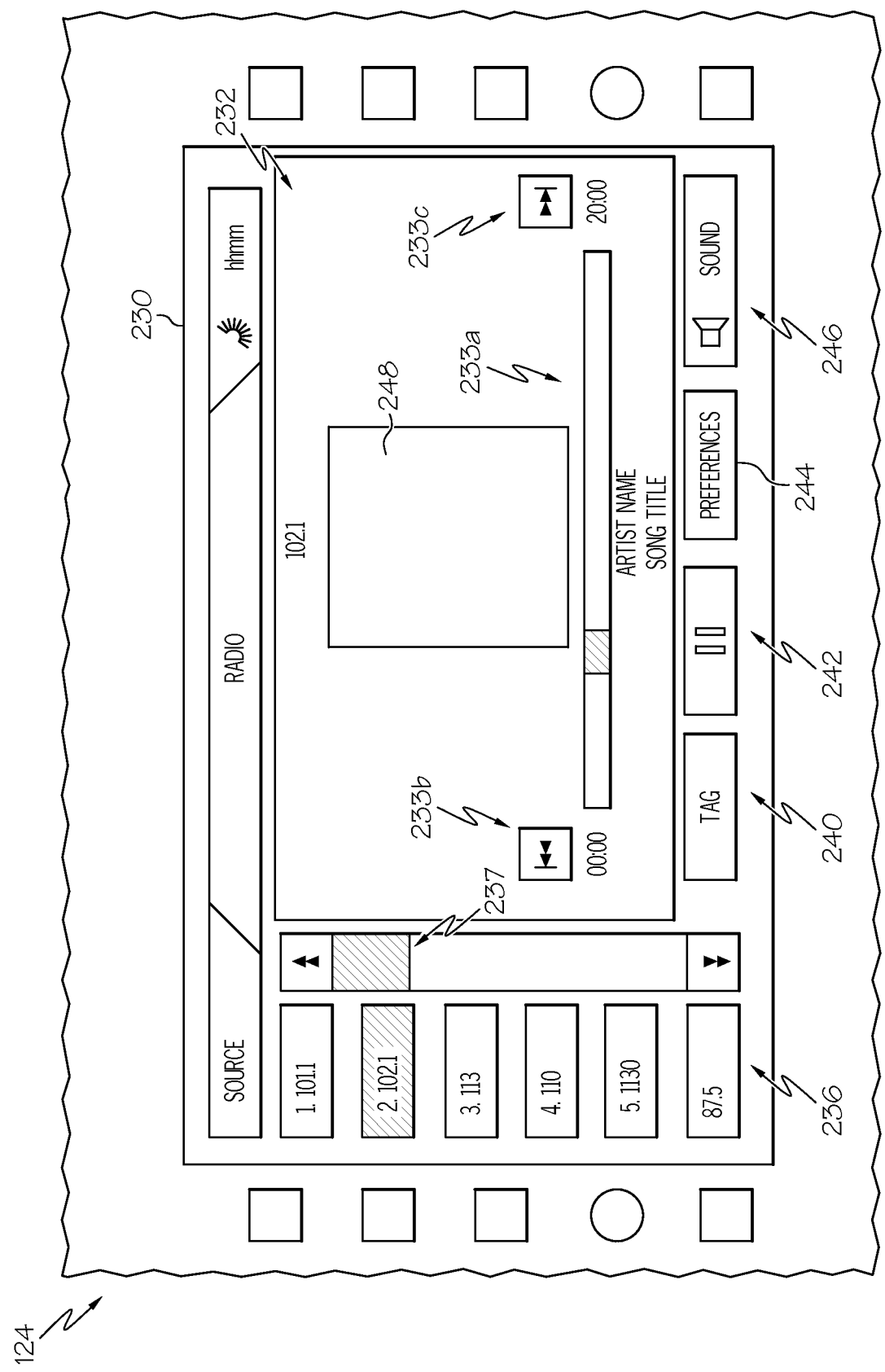
FIG. 2 schematically depicts an in-vehicle user interface for providing content and in-vehicle imagery related to the content, according to embodiments disclosed herein.

FIG. 2 schematically depicts an in-vehicle user interface 230 for providing content portion and in-vehicle imagery, according to embodiments disclosed herein. As illustrated, the in-vehicle user interface 230 may be provided on the display device 124 of the vehicle 102. The in-vehicle user interface 230 includes a currently playing section 232 for providing the content portion that is currently playing in the vehicle 102. The currently playing section 232 may include a progress option 233a, reverse option 233b, and a forward option 233c. The progress option 233a may be utilized for informing the user of the progress of the currently playing media and/or manually selecting a time on the currently playing media to play. The reverse option 233b may be utilized for rewinding or restarting the currently playing media. Similarly, the forward option 233c may be utilized for fast forwarding or skipping the currently playing media.

Also included is a channel section 236 for selecting different channels. The channel section 236 may include a plurality of channels from which the user can select. As indicated in the in-vehicle user interface 230, channel 2 (102.1) has been selected. Additional channels may be selected by a user selection of the scroll bar 237.

The in-vehicle user interface 230 may also include a tag option 240, a pause option 242, a preferences option 244, and a sound option 246. In response to selection of the tag option 240, the currently playing content portion may be tagged for later retrieval. Similarly, in response to selection of the pause option 242, the currently playing content portion may be paused and buffered for resuming at a future time. In response to selection of the preferences option 244, additional options may be provided, such as described with reference to FIG. 3. Similarly, in response to selection of the sound option 246, one or more sound related settings may be provided. The sound settings may include volume settings, maximum volume level settings, volume equalizer settings, bass settings, treble settings, balance settings, etc. Other sound related settings may also be provided.

Specifically, the vehicle 102 may receive a broadcast media signal, such as a radio signal. The broadcast media signal may include a content portion and a metadata portion. The content portion may include the audio and/or video that is played in the vehicle 102. The metadata may include information related to the content being received, such as title, artist name, album title, etc. Additionally, the metadata may include an album cover image or other image to identify and/or provide supplemental information on the currently playing content. Accordingly, the content portion may be provided for display, such as through the speaker 122 (FIG. 1), while metadata may be provided via the display device 124, as depicted in the in-vehicle user interface 230.

Also included in the in-vehicle user interface 230 is an image section 248 for receiving an image that relates to the currently playing content. Accordingly, the album cover image included in the metadata may be provided in the image section 248 to provide additional information and/or aesthetics to the in-vehicle user interface 230. However, as discussed above, the album cover image may be unavailable and/or not included with the metadata. As a consequence, the vehicle computing device 114 may communicate with a database or other remote computing device (such as the remote computing device 604 from FIG. 6) for the album cover image. As an example, the vehicle computing device 114 may send at least a portion of the received metadata and/or other information regarding the currently playing content. The remote computing device 604 may receive the information and determine if the requested album cover image is available. If so, the remote computing device 604 may send the album cover image to the vehicle computing device 114. The vehicle computing device 114 may facilitate the display of the received album cover image on the display device 124.

Additionally, in some embodiments, the remote computing device 604 may not currently store the requested album cover image. As a consequence, the remote computing device 604 may indicate this to the vehicle computing device 114. The vehicle computing device 114 may then request a lower priority image, such as an artist image. The remote computing device 604 may then determine whether the artist image is stored and, if so, send the requested artist image.

It should be understood that while the vehicle computing device 114 may determine the artist image that is desired based on the received metadata, in some embodiments, the remote computing device 604 may make this determination. In such embodiments, the remote computing device 604 may utilize the information initially received by the vehicle computing device 114 to determine the artist image and send a specific request for that image to the remote computing device 604.

Regardless, if the remote computing device 604 does not store the requested artist image, a determination may be made regarding whether the remote computing device 604 stores a genre image or other tertiary image. Specifically, a genre may be identified in the metadata and this may be utilized to determine whether the remote computing device 604 stores the genre image. In response to determining that the remote computing device 604 does not store the genre image, a determination may be made regarding whether the remote computing device 604 stores a station logo image. If not, a determination may be made regarding whether the remote computing device 604 stores a generic image. Regardless of which image is stored by the remote computing device 604, this image may be sent to the vehicle computing device 114 for display on the display device 124.

It should be understood that while the embodiments described above relate to the remote computing device 604 storing one or more of the images, this is merely an example. In some embodiments, the vehicle computing device 114 may store one or more of the images, such that the remote computing device 604 need not be contacted.

Regardless, once the vehicle computing device 114 locates an image, the image may be provided in the image section 248. If the image is the album cover image, this image may be kept until the content playback is complete. If the image is one of the lower priority images, the vehicle computing device 114 may continue to search for a higher priority image until either the content playback is complete or the album cover image is displayed. This allows the display of some imagery for a greater portion of the playback of the content, until the highest priority image is displayed.

It should also be understood that upon receiving an image from the remote computing device 604, the vehicle computing device 114 may store that image such that if the content is again provided for playback in another broadcast media signal, the vehicle computing device 114 may determine if the image is stored locally and, if so, simply provide that image for display. As such, if the vehicle computing device 114 stores the album cover image (or other highest priority image), the lower priority images stored by the vehicle computing device 114 may be deleted. With that said, in some embodiments, the vehicle computing device 114 simply stores all received images.

Figure 3:
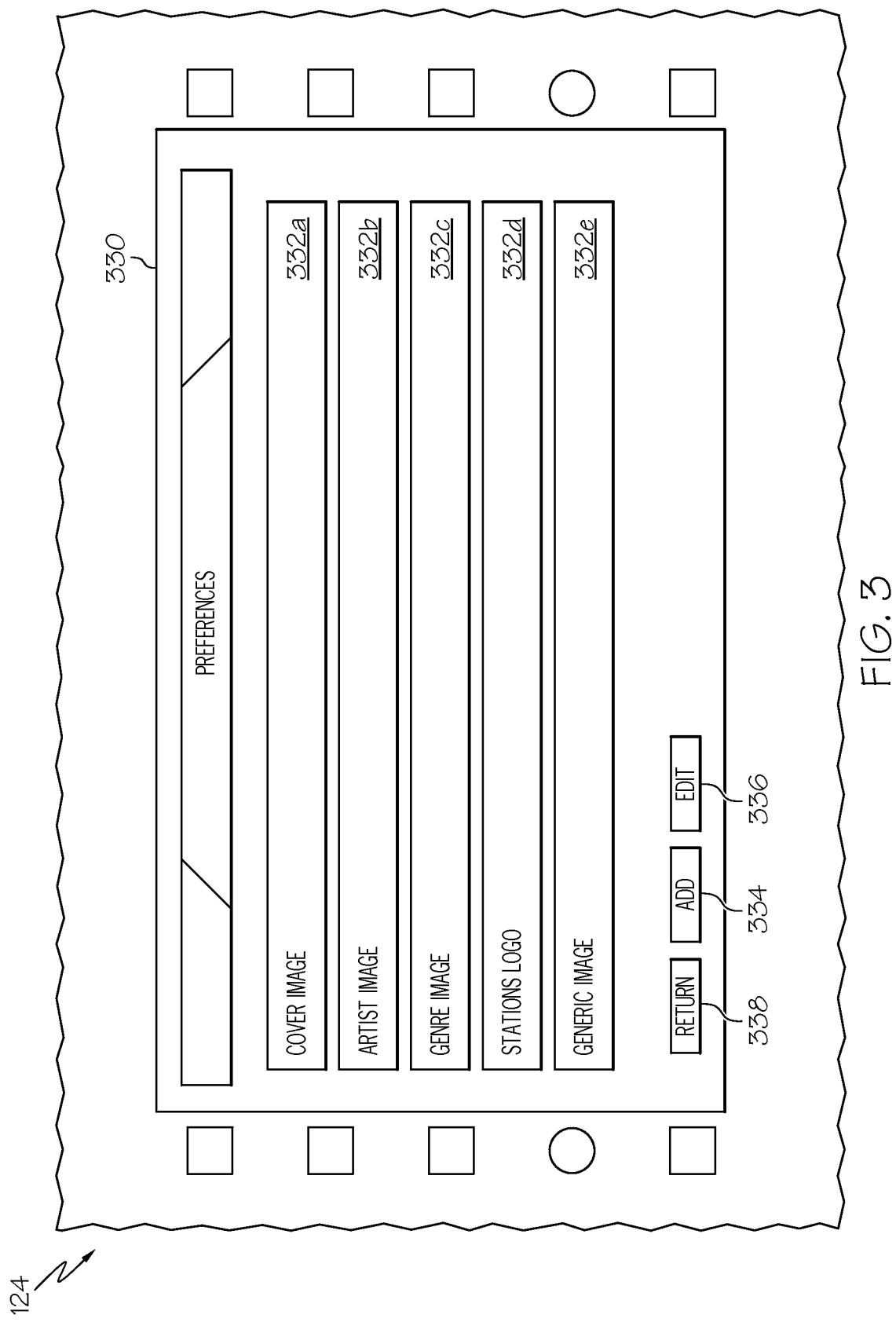
FIG. 3 schematically depicts an in-vehicle user interface for providing priority options for different types of in-vehicle imagery, according to embodiments disclosed herein.

FIG. 3 schematically depicts an in-vehicle user interface 330 for providing preference options for in-vehicle imagery, according to embodiments disclosed herein. In response to selection of the preferences option 244 from FIG. 2, the in-vehicle user interface 330 may be provided. As illustrated, the in-vehicle user interface 330 may include a cover image option 332*a*, an artist image option 332*b*, a genre image option 332*c*, a stations logo option 332*d*, and a generic image option 332*e*. As such, the user may define the order of priority for each of the images that may be provided for the content. As an example, if the user prefers to always view an artist image, the artist image will be displayed and other images will only be displayed if the artist image is not available.

Additionally, an add option 334 and an edit option 336 may be provided. In response to selection of the add option 334, the user may be provided with options for adding an additional image type. This may include providing a list from which to select the new image type and/or providing a template for the user to define another image type. The new image type may include images from a particular source, and/or other criteria. As an example, the user may determine that images retrieved from a user computer (such as the user computing device 606 from FIG. 6) have highest priority. As another example, the user may prefer that a predetermined image be displayed until the highest priority image is displayed. Similarly, the edit option 336 may be provided to edit the criteria utilized for the existing image types. A return option 338 is also provided for returning back to the in-vehicle user interface 230 from FIG. 2.

Figure 4:
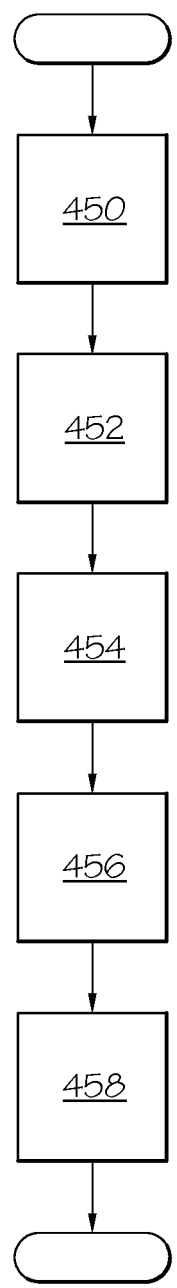
FIG. 4 depicts a flowchart for providing an in-vehicle image supplement, according to embodiments disclosed herein.

FIG. 4 depicts a flowchart for providing an in-vehicle image supplement, according to embodiments disclosed herein. As illustrated in block 450, a broadcast media signal may be received by the vehicle, the broadcast media signal including a content portion and a metadata portion. As an example, the vehicle 102 may receive a radio signal that includes the content portion and the metadata portion. In block 452, a determination may be made regarding whether a primary image is included in the metadata. In block 454, in response to determining that the primary image is included in the metadata, the primary image may be provided for display. In block 456, in response to determining that the primary image is not included in the metadata, a determination may be made regarding whether the primary image is otherwise available and, if so, the primary image may be retrieved and provided for display. In block 458, in response to determining that the primary image is not otherwise available, a secondary image may be retrieved. The secondary image may then be provided for display. In response to determining that the primary image later becomes available, the secondary image may be replaced with the primary image.

Figure 5:
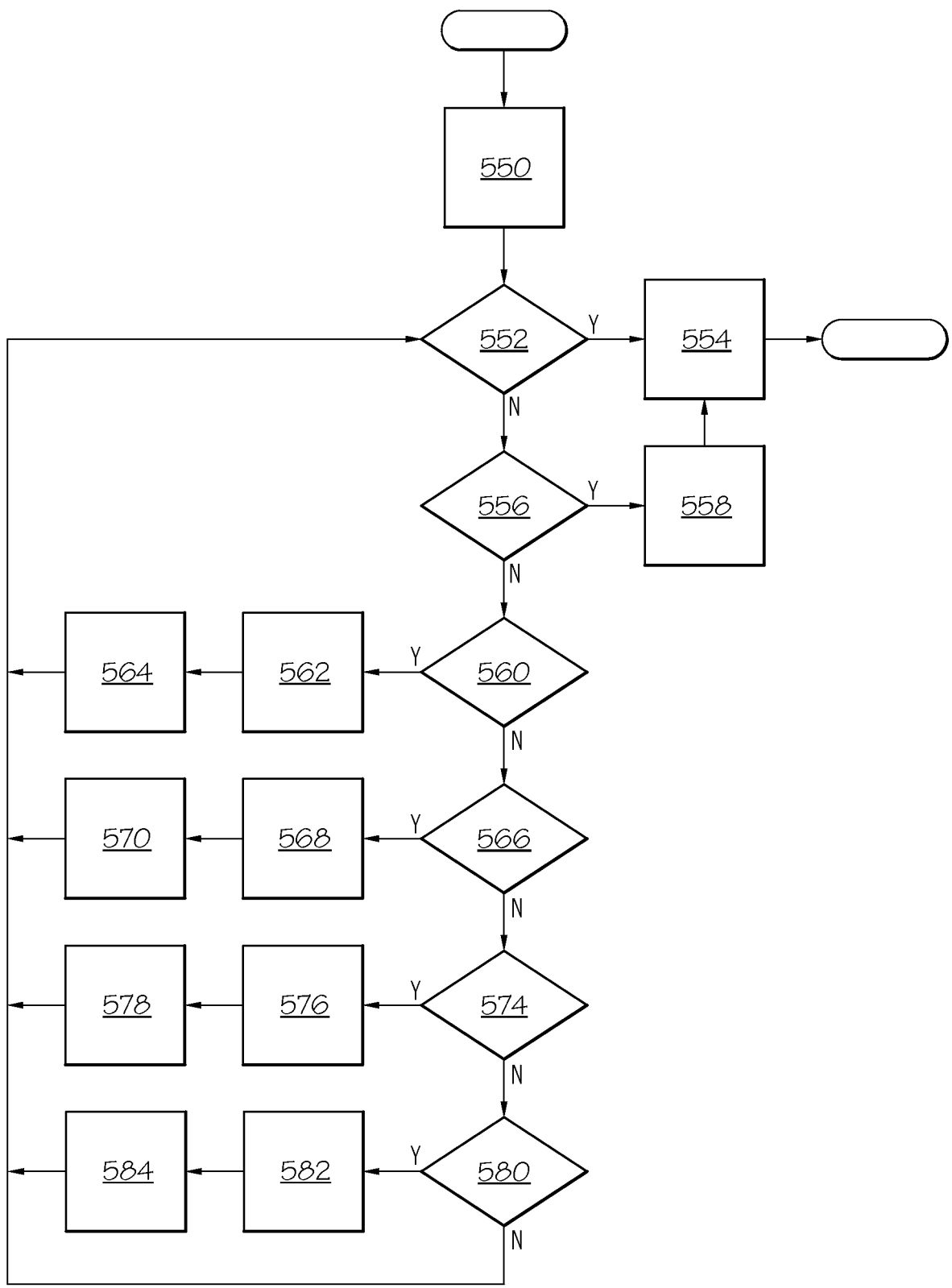
FIG. 5 depicts a flowchart for determining an image for providing on a display device, according to embodiments disclosed herein.

FIG. 5 depicts a flowchart for determining an image for providing on a display device 124, according to embodiments disclosed herein. As illustrated in block 550, a content portion and a metadata portion may be received by the vehicle 102. In block 552, a determination may be made regarding whether an album cover image is included in the metadata portion. If the album cover image is included in the metadata portion, in block 554, the album cover image may be provided to the display device 124 for display. If in block 552, the album cover is not included in the metadata portion, the flowchart may proceed to block 556 where a determination is made regarding whether the album cover image is stored locally in the vehicle computing device 114 and/or remotely, such as on a remote computing device 604 (FIG. 6). If the album cover image is stored locally and/or remotely (or is otherwise available), in block 558 the album cover image may be retrieved. The flowchart may then proceed to block 554 to provide the album cover image to the display device 124 and the process may end.

Returning to block 556, if the album cover image is not stored locally or remotely (or otherwise available), the flowchart may proceed to block 560, where a determination is made regarding whether an artist image is stored locally and/or remotely. If so, in block 562 the artist image may be retrieved. In block 564, the artist image may be provided to the display device 124 for display. If at block 560, the artist image is not stored locally or remotely, the flowchart proceeds to block 566, to determine whether a genre image is stored locally and/or remotely. If the genre image is stored locally and/or remotely, in block 568 the genre image may be retrieved. In block 570, the genre image may be provided to the display device 124 for display.

Returning to block 566, if the genre image is not stored locally and/or remotely (or otherwise available), the flowchart may proceed to block 574 to determine whether a station logo image is stored locally and/or remotely. If the station logo image is stored locally and/or remotely, in block 576, the station logo image may be retrieved. In block 578, the station logo image may be provided to the display device 124 for display. If at block 574, the station logo image is not stored locally and/or remotely, in block 580 a determination is made if a generic image is stored locally and/or remotely. If a generic image is stored locally and/or remotely, in block 582 the generic image may be retrieved. In block 584, the generic image may be provided to the display device 124 for display.

As also illustrated in FIG. 5, once the artist image, genre image, station log, and/or generic image are provided to the display device 124 or no image is available, the flowchart returns go block 552 to determine whether the album cover image is available. Specifically, the process is configured such that if a higher priority image becomes available, that higher priority image is retrieved and provided to the display device 124 to replace the lower priority image. Similarly, in some embodiments, the vehicle computing device 114 may also store the higher priority image.

It should be understood that while a particular type of image and hierarchy are described with reference to FIG. 5, this is merely an example. Depending on the embodiment, other image types may be utilized and the hierarchy may change.

FIG. 6 depicts a network environment for providing an in-vehicle image supplement, according to embodiments disclosed herein. The vehicle 102 is depicted in FIG. 6 as an automobile but may be any passenger or non-passenger vehicle such as, for example, a terrestrial, aquatic, and/or airborne vehicle. The vehicle 102 may be coupled to the remote computing device 604 and/or a user computing device 606 for receiving content, user settings, imagery, and/or other data via a network 600. The network may include a wide area network, local area network, and/or other wired or wireless network for communicating data, as described herein.

Also illustrated is the vehicle computing device 114, which includes the processor 132, input/output hardware 608, the network interface hardware 650, a data storage component 636 (which stores image data 638a, priority data 638b, and/or other data), and the memory component 134. The memory component 134 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 114 and/or external to the vehicle computing device 114.

The memory component 134 may store operating logic 642, the image logic 144a, and the triggering logic 144b. The image logic 144a and the triggering logic 144b may each include a plurality of different pieces of logic, each of which may be embodied as a computer program, firmware, and/or hardware, as an example. A local interface 634 is also included in FIG. 6 and may be implemented as a bus or other communication interface to facilitate communication among the components of the vehicle computing device 114.

The processor 132 may include any processing component operable to receive and execute instructions (such as from a data storage component 636 and/or the memory component 134). As described above, the input/output hardware 608 may include and/or be configured to interface with the components of FIG. 6. As an example, the input/output hardware 608 may include the microphones 120, the speakers 122, the display device 124, and/or other hardware in the vehicle 102

The network interface hardware 650 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the vehicle computing device 114 and other computing devices.

The operating logic 642 may include an operating system and/or other software for managing components of the vehicle computing device 114. Similarly, as discussed above, the image logic 144a may reside in the memory component 134 and may be configured to cause the processor 132 to provide one or more of the user interfaces described herein. Similarly, the triggering logic 144b may be utilized to determine the triggering action for implementing the functionality described herein.

It should be understood that while the components in FIG. 6 are illustrated as residing within the vehicle computing device 114, this is merely an example. In some embodiments, one or more of the components may reside external to the vehicle computing device 114. It should also be understood that, while the vehicle computing device 114 in FIG. 1 is illustrated as a single device, this is also merely an example. In some embodiments, the image logic 144a and the triggering logic 144b may reside on different computing devices. As an example, one or more of the functionality and/or components described herein may be provided by a remote computing device 604 and/or user computing device 606, which may be coupled to the vehicle 102 via a network 600, which may be embodied as a wide area network and/or local area network.

Additionally, while the vehicle computing device 114 is illustrated with the image logic 144a and the triggering logic 144b as separate logical components, this is also an example. In some embodiments, a single piece of logic may cause the vehicle computing device 114 to provide the described functionality.

As illustrated above, various embodiments for providing an in-vehicle image supplement are disclosed. The embodiments provide the user with an image related to currently playing content, even if the metadata received with the content does not include an image. Additionally, if a higher priority image becomes available at a later time, either from the metadata or elsewhere, the higher priority image may be substituted for the lower priority image.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

What is claimed is:

1. A method for providing an in-vehicle image supplement comprising:
   receiving a broadcast media signal, the broadcast media signal including a content portion and a metadata portion;
   determining a priority of types of images associated with the content portion, wherein the types of images include a primary image having highest priority, a secondary image having priority after the primary image, and a tertiary image having priority after the secondary image;
   determining whether an image is included in the metadata portion;
   in response to determining that an image is included in the metadata portion, determining whether the image is a primary image;
   in response to determining that the image is a primary image, providing the primary image for display;
   in response to determining that the image is not a primary image, determining whether the primary image is otherwise available and in response to determining that the primary image is otherwise available, retrieving the primary image and providing the primary image for display; and
   in response to determining that the primary image is not otherwise available, determining whether the metadata includes a secondary image and in response to determining that the metadata includes a secondary image, providing the secondary image for display;
   in response to determining that the metadata does not include a secondary image, determining whether a secondary image is otherwise available, in response to determining that the secondary image is otherwise available, retrieving the secondary image, providing the secondary image for display, and in response to determining that the primary image becomes available, replacing the secondary image with the primary image, wherein a higher priority image may replace a lower priority image, but a lower priority image may not replace a higher priority image.

2. The method of claim 1, further comprising:
   in response to determining that the secondary image is not available, determining whether a tertiary image is available;
   in response to determining that the tertiary image is available, retrieve the tertiary image and provide the tertiary image for display.

3. The method of claim 2, further comprising, in response to determining that the tertiary image is not available, retrieving a generic image and providing the generic image for display.

4. The method of claim 2, further comprising, in response to determining that the tertiary image is not available, retrieving a station logo image and providing the station logo image for display with the content portion.

5. The method of claim 2, wherein the primary image includes an album cover image, wherein the secondary image includes an artist image, and wherein the tertiary image includes a genre image.

6. The method of claim 2, further comprising, in response to determining that the secondary image becomes available, replacing the secondary image for the tertiary image.

7. The method of claim 1, further comprising:
   storing the primary image; and
   in response to receiving another broadcast media signal, providing the primary image for display.

8. A system for providing an in-vehicle image supplement comprising:
   a memory component that stores logic that, when executed by the system, causes the system to perform at least the following:
   receive a broadcast media signal, the broadcast media signal including a content portion and a metadata portion;
   determining a priority of types of images associated with the content portion, wherein the types of images include an album cover image having highest priority, an artist image having priority after the primary image;
   determine whether the metadata includes an image associated with the content portion;
   in response to determining that the metadata includes an image associated with the content portion, determine whether the image is an album cover image;
   in response to determining that the album cover image is included in the metadata portion, provide the album cover image for display;
   in response to determining that the image is not an album cover image, determine whether the album cover image is stored and, in response to determining that the album cover image is stored, retrieve the album cover image and provide the album cover image for display; and
   in response to determining that the album cover image is not stored, determine whether the metadata includes an artist image and in response to determining that the metadata includes an artist image, provide the artist image for display;
   in response to determining that the metadata does not include an artist image, determine whether an artist image is stored, in response to determining that the artist image is stored, retrieve the artist image, provide the artist image for display, and in response to determining that the album cover image becomes available, replace the artist image with the album cover image, wherein a higher priority image may replace a lower priority image, but a lower priority image may not replace a higher priority image.

9. The system of claim 8, wherein the logic further causes the system to, in response to determining that the artist image is not stored, determine whether a genre image is stored remotely, in response to determining that the genre image is stored remotely, retrieve the genre image and provide the genre image for display.

10. The system of claim 9, wherein, in response to determining that the genre image is not stored, the logic causes the system to retrieve a generic image and provide the generic image for display.

11. The system of claim 10, wherein the generic image is stored in at least one of the following locations: locally and remotely.

12. The system of claim 9, wherein, in response to determining that the genre image is not stored, the logic causes the system to retrieve a station logo image and provide the station logo image for display.

13. The system of claim 9, wherein in response to determining that the artist image becomes available, the logic further causes the system to replace the artist image for the genre image.

14. The system of claim 8, wherein the logic further causes the system to perform at least the following:
store the album cover image; and
in response to receiving another broadcast media signal, providing the album cover image for display.

15. A vehicle for providing an in-vehicle image supplement comprising:
a display device; and
a vehicle computing device that stores logic that, when executed by the vehicle computing device, causes the vehicle computing device to perform at least the following:
receive a broadcast media signal, the broadcast media signal including a content portion and a metadata portion;
determine a priority of types of images associated with the content portion, wherein the types of images include a primary image having highest priority, a secondary image having priority after the primary image, and a tertiary image having priority after the secondary image;
determine whether an image is included in the metadata portion;
in response to determining that an image is included in the metadata portion, determining whether the image is a primary image;
in response to determining that the image is a primary image, provide the primary image for display with the content portion;
in response to determining that the image is not a primary image, determinate whether a primary image is otherwise available;
in response to determining that a primary image is otherwise available, retrieve the primary image and provide the primary image for display with the content portion;
in response to determining that the primary image is not otherwise available, determine whether the metadata includes a secondary image and in response to determining that the metadata includes a secondary image, provide the secondary image for display;
in response to determining that the metadata does not include a secondary image, determine whether a secondary image is otherwise available, and in response to determining that a secondary image is otherwise available, retrieve the secondary image and provide the secondary image for display with the content portion; and
in response to determining that the primary image becomes available after display of the secondary image, replace the secondary image with the primary image,
wherein a higher priority image may replace a lower priority image, but a lower priority image may not replace a higher priority image.

16. The vehicle of claim 15, wherein, in response to determining that the secondary image is not available, the logic causes the vehicle computing device to retrieve a tertiary image and provide the tertiary image for display with the content portion.

17. The vehicle of claim 15, wherein, the logic further causes the vehicle computing device to provide an option for a user to determine the primary image.

18. The vehicle of claim 15, wherein the primary image comprises an album cover image and the secondary image comprises at least one of the following: an artist image, a genre image, a station logo image, and a generic image.

19. The vehicle of claim 15, wherein the logic further causes the vehicle computing device to perform at least the following:
store the primary image; and
in response to receiving another broadcast media signal, provide the primary image for display.

20. The method of claim 1, wherein the priority of types of images includes: 1) an album cover image acquired from a source; 2) the album cover image acquired from a database; 3) an artist image; 4) a genre image; 5) a station logo image; and 6) a generic image.

* * * * *